United States Patent [19]

Takahashi et al.

[11] Patent Number: 4,488,182
[45] Date of Patent: Dec. 11, 1984

[54] SYSTEM FOR RECORDING AND REPRODUCING TIME-DIVISION MULTIPLEXED DIGITAL AUDIO AND VIDEO SIGNALS

[75] Inventors: Nobuaki Takahashi, Yamato; Seiichi Takashima, Ayase; Takeshi Shibamoto, Sagamihara; Fujio Suzuki, Machida; Kohji Tanaka, Tokyo, all of Japan

[73] Assignee: Victor Company of Japan, Limited, Yokohama, Japan

[21] Appl. No.: 413,824

[22] Filed: Sep. 1, 1982

[30] Foreign Application Priority Data

Sep. 4, 1981 [JP] Japan .................. 56-139567
Sep. 4, 1981 [JP] Japan .................. 56-139568
Sep. 4, 1981 [JP] Japan .................. 56-139569

[51] Int. Cl.³ .................................... H04N 9/493
[52] U.S. Cl. .................................... 358/310; 358/144; 360/19.1
[58] Field of Search .............. 358/310, 330, 13, 12, 358/141, 142, 143, 144; 360/9.1, 10.1, 35.1, 18, 19.1; 370/85, 77

[56] References Cited

U.S. PATENT DOCUMENTS

| 4,148,077 | 4/1979 | Bragas | 360/9.1 |
| 4,347,527 | 8/1982 | Lainez | 358/310 |
| 4,353,090 | 10/1982 | Broadbent | 360/9.1 |
| 4,417,283 | 11/1983 | Hoshimi | 358/310 |
| 4,447,834 | 5/1984 | Sugiyama | 358/310 |

FOREIGN PATENT DOCUMENTS

184380 11/1982 Japan .................. 358/310

*Primary Examiner*—Michael A. Masinick
*Attorney, Agent, or Firm*—Lowe, King, Price & Becker

[57] ABSTRACT

Analog primary color video signals of a still-picture converted to luminance and color difference components and converted to digital samples. The digital samples of each video component are written into a respective memory at the sampling rate and retrieved by a reading circuit at a rate lower than the sampling rate. Analog multi-channel audio signals are converted to digital samples which are time-division multiplexed with the retrieved digital samples of the video components. The multiplexed digital samples are recorded on a recording disc medium in a spiral track pattern.

14 Claims, 9 Drawing Figures

SYSTEM FOR RECORDING AND REPRODUCING TIME-DIVISION MULTIPLEXED DIGITAL AUDIO AND VIDEO SIGNALS

BACKGROUND OF THE INVENTION

The present invention relates generally to digital recording and playback systems, and in particular to the recording of a sequence of time-division multiplexed digital stereophonic signals and a color video signal of a still-picture along a spiral track of a disc record and a playback system therefor.

It is known in the art that multi-channel audio signals are converted to pulse code modulated digital signals which are interleaved together to a sequence of time division multiplexed signals and recorded along a spiral track of a disc record in the form of a series of microscopic pits. It is desirable, however, to provide visual information as an aid to the listener hearing the music program recorded in the disc.

SUMMARY OF THE INVENTION

The present invention has its object to provide a digital audio recording system in which digital audio signals are combined with a digital video signal of a color still-picture to serve as a visual aid for listeners.

The digital recording system of the invention comprises means for generating still-picture primary color video signals which occur within a frame of interlaced odd-number and even-number fields according to one of the standard line scan formats, a matrix circuit for converting the primary color video signals into a luminance component and color difference components, and means for converting each of multi-channel analog audio signals into a sequence of digital samples of an audio signal. Each of the luminance and color difference components is also converted to a sequence of digital samples of a video component. Storage means having a plurality of storage areas is provided. Writing and reading means is provided for writing the luminance and color difference digital samples into respective storage areas at a given rate and sequentially reading the digital samples of each video component from the respective storage areas at a rate lower than the given rate so that video components are arranged in a time sequence. Further provided is a means for time-division multiplexing the audio digital samples with the digital samples of the video components for recording on a recording disc medium.

Due to the existence of different color television systems, i.e. NTSC, PAL and SECAM, it is desirable that the signal be recorded in a format which is compatible with any one of the different television systems. The scan format is preferably of a 625-line scan format.

According to a feature of the invention, the writing and reading means is arranged to write the digital samples of each video component into first and second sections of the respective storage area so that the odd-number and even-number fields of each video component are stored in the first and second sections respectively and is further arranged to read the digital samples of each video component alternately out of the first and second sections in response to each line scan of the format. In this way, the interlaced scan format of the original video signal is converted to a non-interlaced scan format which facilitates conversion of the 625-line scan format to the 525-line scan format when the recorded digital video signal is reproduced.

According to another feature of the invention, there is provided a digital playback system adapted for reproducing a sequence of time-division multiplexed digital samples of multi-channel audio signals and digital samples of video components of luminance and color difference of a still-picture signal recorded in a disc record, the digital samples of the video components being organized according to one of standardized line scan formats. The playback system comprises means for detecting the digital samples from the disc record, means for demultiplexing the digital samples of said audio signals and the digital samples of said video components, storage means having a plurality of storage areas, and means for sequentially writing the demultiplexed digital samples of each video component into a corresponding storage area of the storage means and sequentially reading the digital samples of each video component out of the storage area simultaneously with the reading of the other video components at a rate higher than the rate at which the digital samples are written into the storage means so that the video components are arranged in respective sequences of digital samples. Further included is a means for converting the digital samples of each multi-channel audio signal to an analog multi-channel audio signal and converting the digital samples of each video component to an analog video component.

According to a further feature of the invention, the writing and reading means of the playback system is arranged to write the digital samples of each video component alternately into first and second sections of the corresponding storage area in response to the line scan of the format and is further arranged to sequentially read one-half of the digital samples of each video component from the first section of the corresponding storage area and subsequently read the remainder of the digital samples from the second section of the corresponding storage area, whereby the non-interlaced scan format of the recorded signal is converted to the interlaced scan format.

According to still further feature of the invention, the playback system further includes means for converting the scan format of the demultiplexed digital samples of each video component to 525-line scan format.

BRIEF DESCRIPTION OF THE DRAWINGS

The present invention will be described in further detail with reference to the accompanying drawings, in which.

DETAILED DESCRIPTION

Figure 1:
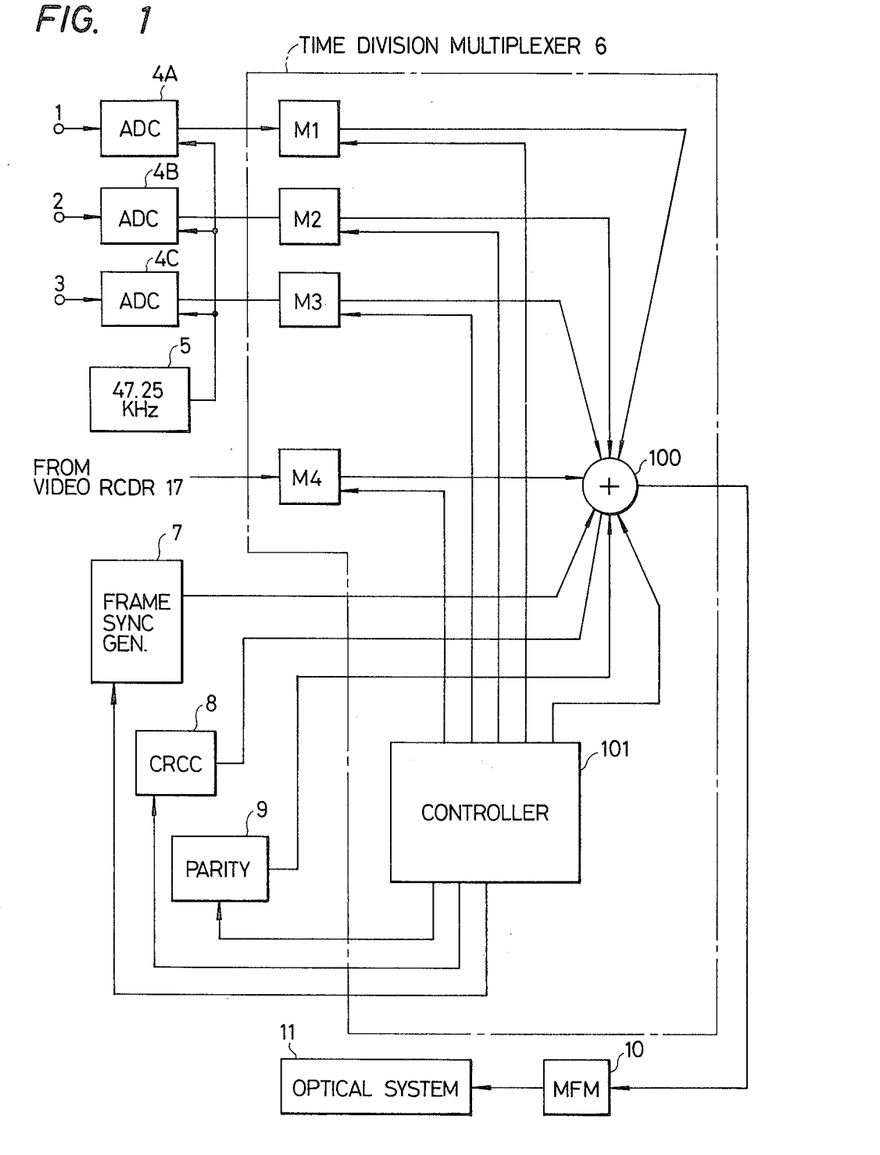
FIG. 1 is a block diagram illustrating a portion of the digital recording system of the invention.
Figure 2:
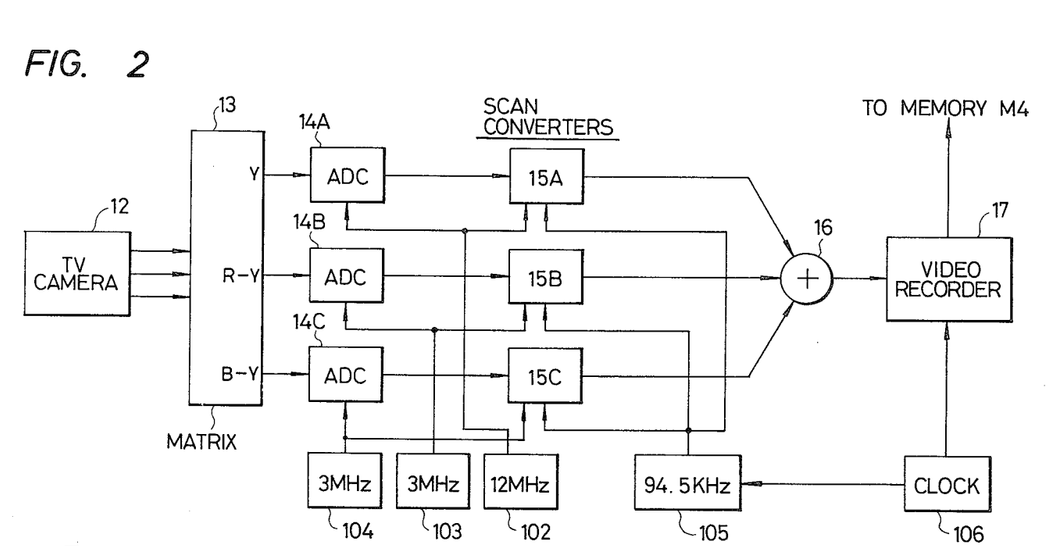
FIG. 2 is a block diagram of a video section of the recording system.
Figure 3:
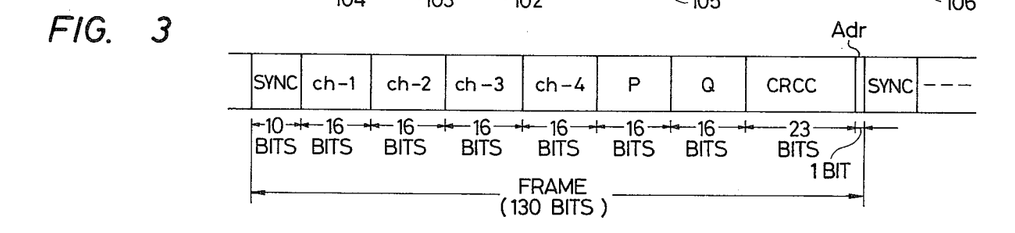
FIG. 3 is an illustration of the digital word organization of a recorded signal.

Referring now to FIGS. 1 and 2, there is shown a preferred embodiment of the digital recording system of the invention. Three-channel analog stereophonic signals are applied to input terminals 1, 2 and 3. The signals applied to terminals 1 and 3 are derived from left and right microphones and the signal on terminal 2 is derived from a center microphone or derived from a circuit, not shown, so that it contains acoustophysiological information for localizing a sonic image between right and left speakers to enhance the realism. The system comprises a set of PCM encoders or analog-to-digital converters 4A, 4B and 4C for sampling the analog signals at 47.25 kHz, for example, in response to sampling pulses supplied from a clock source 5 and quantizing the sampled analog values into 16-bit digital signals. The digitized audio signals are stored in time compression memories M1, M2, M3 which form part of a time division multiplexer 6. A 16-bit digital video signal of a color still-picture is supplied from a video recorder 17 (FIG. 2) to a time compression memory M4 in a manner as will be described below. To organize the audio and video signals with frame sync and redundant signals into a synchronized frame of 130-bit digital words the digitally coded signals are sequentially read out of the memories M1 to M4 into an adder 100 in response to timing signals supplied from a controller 101 at a rate higher than the rate at which they are written into the memories. The frame sync signal is a 10-bit word generated by a frame sync generator 7, and the redundant signals comprise a 23-bit cyclic redundant check code developed in a known CRCC generator 8 and 16-bit Q parity and 16-bit P parity words generated by a known parity word generator 9. The frame sync generator 7, CRCC generator 8 and parity word generator 9 are triggered by timing signals from the controller 101 so that their outputs are combined in the adder 100 with the digital audio and video signals into a format as shown in FIG. 3. The combined digital words are appended by a one-bit address code provided from the controller 101.

The output from the time division multiplexer 6 is applied to a frequency modulator 10 where it undergoes modulation known as "modified frequency modulation" and fed to an optical system 11.

In FIG. 2, a color picture is televised by a 625-line format color television camera 12 to generate red, green and blue analog primary color signals, each primary color signal being formed by an odd-number field and an even-number field which are interlaced in a conventional manner. These primary color signals are applied to a known matrix circuit 13 to process the input signals into a luminance signal Y, a first color difference signal R-Y and a second color difference signal B-Y which are respectively fed to PCM encoders, or analog-to-digital converters 14A, 14B and 14C. The color difference signals (R - Y) and (B - Y) are derived in known manner such that each of their bandwidths is ¼ of the bandwidth of the luminance signal to take advantage of the known fact that the human eyes are less sensitive to color information than they are to luminance level. The luminance signal having a bandwidth of 5 MHz is sampled and quantized into 8-bit digital words at 12 MHz by the analog-digital converter 14a in response to sampling pulses from a clock source 102, while the color difference signals R-Y and B-Y are each sampled and quantized into 8-bit digital words at 3 MHz by the analog-digital converters 14b and 14c in response to sampling pulses from clock sources 103 and 104.

The digitized luminance and color difference signals are fed to scan converters 15A, 15B and 15C, respectively, at their respective sampling rates and sequentially read out at a reduced rate 94.5 kHz, for example, by a reading circuit 105 which is clocked by a source 106 so that the digital luminance signal may be retrieved for a 4-second period and each color difference signal may be retrieved for a 1-second period. The digital words from the scan converters 15A, 15B and 15C are serially combined in an adder 16 to form a sequence of time division multiplexed digital words and applied to the video recorder 17.

Figure 4:
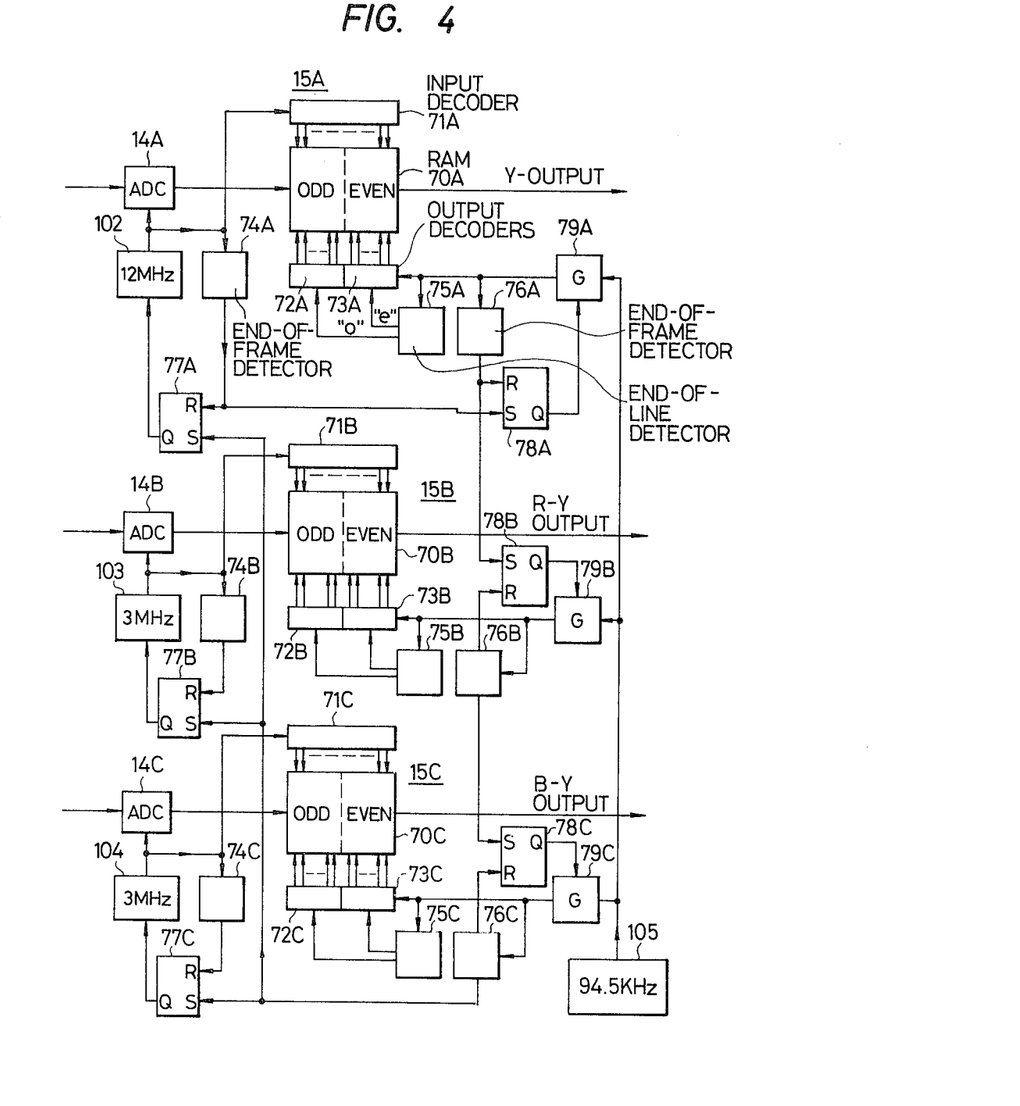
FIG. 4 is a block diagram of the detail of the scan converters of FIG. 2.

Details of the writing and reading operations of the scan converters 15 will be described with reference to FIG. 4. The scan converter 15A comprises a random access memory 70A having a plurality of cell locations arranged in a matrix of rows and columns. An input decoder 71A and a pair of output decoders 72A and 73A are connected to the memory 70A. The input decoder 71A receives the 12-MHz sampling pulses from the clock source 102 for addressing the cell locations to write the odd-number field into a first half section of the memory and the even-number field into the second half section so that the data bits of each scan line are stored in corresponding row cells of a corresponding column. An end-of-frame detector 74A is conected to the output of the clock source 102 to detect when all bits of a luminance frame have been stored in the memory 70A and triggers a flip-flop 77A into a reset condition to disable the clock source 102. At the same time a flip-flop 78A is triggered to open a gate 79A to apply reading pulses from the pulse source 105 to the output decoders 72A and 73A simultaneously.

The output decoders 72A and 73A are respectively associated with the first and second half sections of the memory 70A for reading odd- and even-number field data. A detector 75A is coupled to the output of the gate 79A to count the gated pulses to provide an "odd" output to the decoder 72A and an "even" output to the decoder 73A. The "odd" output of the detector 75A is initially at high voltage level. The high voltage condition is switched to the "even" output when the count corresponds to the number of bits stored in the cells along each column of the memory 70A. Therefore, the data bits on the first scan line of the odd-number field are read out of the cell locations of the first section onto an output line 80A followed by the data bits on the first scan line of the even-number field and so on, so that data on each scan line of the odd- and even-number fields are alternately read out of the memory into the adder 16. An end-of-frame detector 76A is coupled to the output of gate 79A to detect when all the luminance data bits are read out of the memory 70A to reset the flip-flop 78A to cease the application of the reading pulse. This reset signal is also applied to a flip-flop 78B of the scan converter 15B which is of the identical construction to the scan converter 15A.

Simultaneously with the application of luminance digital signals to the scan converter 15A, the signal from the converter 14B is also applied to the input decoder 71B of the scan converter 15B. When all the bits of R-Y color difference data are written into the memory 70B in the same manner as in scan converter 15A, the end-of-frame detector 71B triggers the flip-flop 77B, so that the writing clock source 103 is disabled. The reading of data stored in memory 70B is initiated in response to the output of the end-of-frame detector 76A of the scan converter 15A when all the luminance data bits have been read out of the memory 70A. Similar reading operation occurs in the scan converter 15B so that the R-Y color difference data on each scan line of the odd-number field precedes the data on each scan line of the even-number field. The reading operation terminates when the end-of-frame detector 76B resets the flip-flop 78B.

Likewise, the B-Y color difference signal is written into the memory 70C simultaneously with the writing of the other video signals into their respective memories. The reading operation of the memory 70C occurs when the flip-flop 78C is triggered into set condition in response to the output of the end-of-frame detector 76B of the scan converter 15B. When the reading operation of memory 15C terminates, the output of end-of-frame detectgor 76C resets the flip-flop 78C and sets the flip-flops 77A, 77B and 77C to reinitiate the writing of the luminance and color difference dignal signals of the next frame.

Therefore, each of the signals from the scan converters is a sequence of 8-bit words which occurs at a frequency 94.5 kHz which is much lower than the rates at which they are quantized into the digital signals and which is appropriate for multiplexing with the 16-bit words of audio signals which occur at a frequency 47.25 kHz. The outputs from the scan converters 15A, 15B and 15C are thus time-division multiplexed in the adder 16 and recorded on an appropriate recording medium by the video recorder 17.

The signal recorded in the digital recorder 17 is sequentially reproduced to provide 625-line format digital luminance and color difference signals. The latter is applied to the memory M4 of the time division multiplexer 6 and read out of this memory in response to a timing control signal from the controller 101 at a frequency 47.25 to provide a sequence of 16-bit words and serially combined with the three-channel digital audio signals together with the frame sync and redundant codes.

Figure 5:
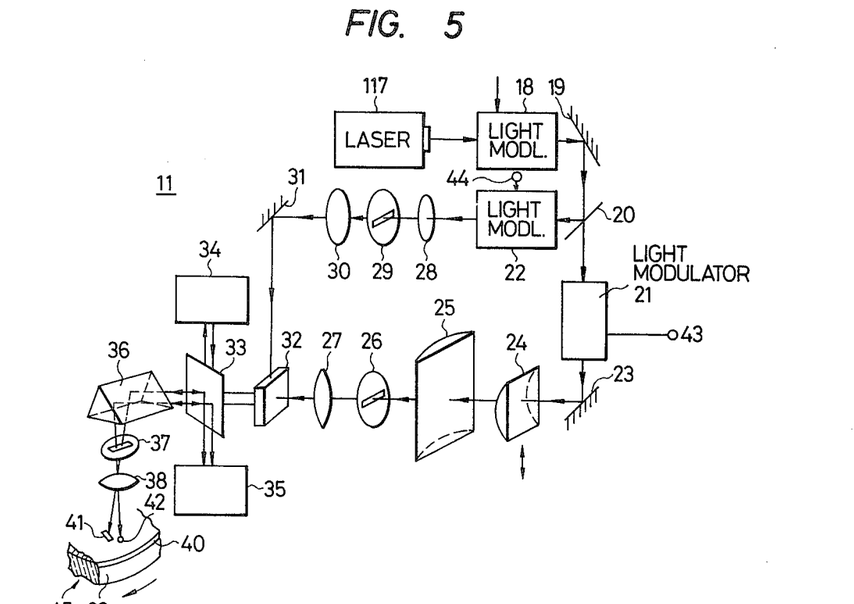
FIG. 5 is a block diagram of the optical system of FIG. 1.

Referring to FIG. 5, details of the optical system 11 are illustrated. The system 11 includes a laser 117 for emission of a laser beam to a light modulator 18 to which a compensation signal is applied for eliminating drift and noise components. The beam leaving the light modulator 18 is reflected on a mirror 19 to a half-silvered mirror, or light splitter 20. A first laser beam divided by splitter 20 is directed to a light modulator 21 where it is modulated with a signal on terminal 43 fed from the MFM modulator 7 and with a third tracking signal $fp_3$ which will be described later. A second laser beam is directed to a second light modulator 22 and modulated with first and second tracking signals $fp_1$ and $fp_2$ on terminal 44 which occur alternately in synchronism with the revolution of a recording master disc 45.

The modulated first laser beam is reflected on a mirror 23 to cylindrical lenses 24 and 25 and a slit 26 where the beam is shaped into a rectangular beam, the beam passing through a convex lens 27 to form a focus on the master disc 45. On the other hand, the modulated second laser beam is passed through a tracking system which comprises a convex lens 28, a slit 29 and a second convex lens 30 to form a circular dot beam which is reflected on a mirror 31. The shaped laser beams are directed to a polarizer prism 32 where they are axially aligned and pass through a half-silvered mirror 33 to a prism 36 and thence to a slit 37. The beams leaving the slit 37 are focused by a lens 38 onto the surface of the disc 45 which comprises typically a glass base 40 and a photosensitive layer 39 formed thereon and which is driven at a constant rotational speed.

Portions of the laser beams reflect on the surface of disc 45 and pass through lens 38, slit 37 and prism 36 onto the half-silvered mirror 33 and splitted into two beams one being directed to a signal monitor system 34 which monitors the deviation of the beams from the right path and another being directed to an optical monitor system 35 which monitors the spacing between the two beams on the surface of the record disc 45. Control signals are generated by the monitor systems to adjust the vertical position of the cylindrical lens 24 to minimize the amount of errors.

Figure 6:
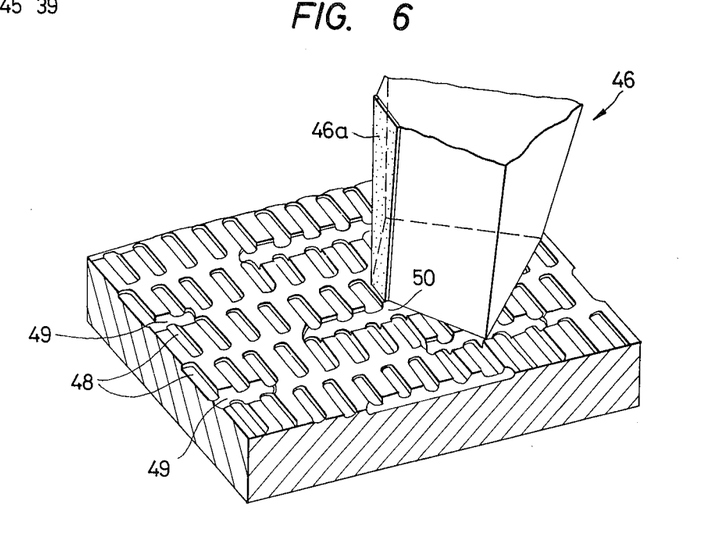
FIG. 6 is a perspective view of a portion of disc record shown with a capacitance detection stylus.

The master disc 45 is processed in a known manner to develop the optical image produced by the impinging beams to form a series of minute pits along a spiral track. Through a series of known processes a stamper is produced from the master disc for mass production of recorded discs. For capacitance detection systems, the disc record comprises a conductive material that forms an electrode and a dielectric layer on which the stamper is copied to form a sequence of transversal pits 47 (see FIG. 6) in a spiral pattern bearing the information signals, a series of longitudinal pits 49 bearing the first tracking signal $fp_1$ on one side of the main track, and a series of longitudinal pits 50 bearing the second tracking signal $fp_2$ on the opposite side of the main track. The switching signal $fp_3$ is recorded on the main track at a point where switching occurs between the first and second tracking signals. Upon reproduction the disc record is placed on a turntable which spins at a speed of 900 r.p.m. and a capacitance detection stylus 46 having an electrode 46a is arranged to rest over several tracks.

Figure 7:
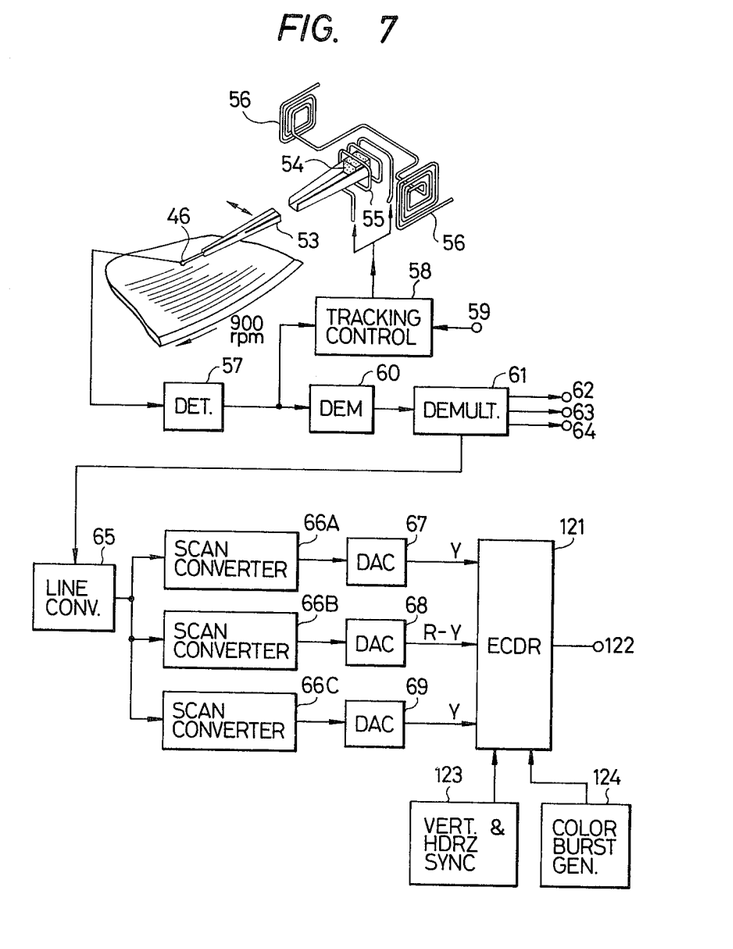
FIG. 7 is a block diagram of the digital playback system of the invention.

As illustrated in FIG. 7, the stylus 46 is attached to the free end of a cantilever 53. A permanent magnet 54, attached to the other end of the cantilever 53, is surrounded by a tracking coil 55 and a jitter correction coil 56 having two coil sections wound separately in the same sense so that they produce an attractive or a repulsive force to move the cantilever 53 in a vertical direction in response to a jitter correction signal applied thereto to compensate for surface irregularities which might exist on the disc. On the other hand, the tracking coil 55 generates a force which is perpendicular to the magnetic flux of the magnet 54 in response to a tracking error signal supplied from a tracking servo control circuit 58 to move the stylus horizontally to keep it on the right track.

The playback system includes a pickup circuit 57 which essentially comprises a tank circuit having its resonance frequency variable according to variations of the capacitance which is formed between the disc 45 and the electrode of the stylus 46, an oscillator for supplying a high frequency signal to the variable frequency tank circuit, a detector for detecting the amplitude of the high frequency signal which varies as a function of the variation of the resonance frequency, and a preamplifier for amplifying the output of the detector. The signal from the pickup circuit 57 is fed to an FM demodulation circuit 60 to recover the information signal recorded on the main track. The signal detected by the pickup circuit 57 is also applied to the tracking servo control circuit 58.

The tracking servo control circuit 58 derives the first, second and third tracking signals $fp_1$, $fp_2$ and $fp_3$ from the signal supplied from the pickup circuit 57 by frequency separation and detects the amplitude of the first and second tracking signals by envelope detection and compares one against the other to derive an error signal for application to the tracking coil 55. Since the tracking signals $fp_1$ and $fp_2$ are switched on alternate tracks, the polarity of the tracking error signal is reversed following the occurrence of each switching signal $fp_3$. The tracking servo control circuit 58 is also supplied with a kick command signal on terminal 59. The circuit 58 responds to this command signal by providing a control signal to the tracking coil 55 to move the stylus laterally by one track width or greater.

On the other hand, the demodulated digital signal from the FM demodulator 60 is applied to a demultiplexer 61 where the information data words are separated into 16-bit words and the presence of error is checked by CRCC code and the error, if any, is corrected by parity bits. The separated digital audio signals appear at output terminals 62, 63, 64 and the video signal is applied to a line format converter 65 in which the 625-line scan format is converted to 525-line format. As described previously, the signal applied to the line converter 65 is a sequence of line signals of alternately occurring odd- and even-number fields, the line format conversion is initiated from the instant the line converter 65 receives the signal on the first scan line of the even-number field.

Figure 8:
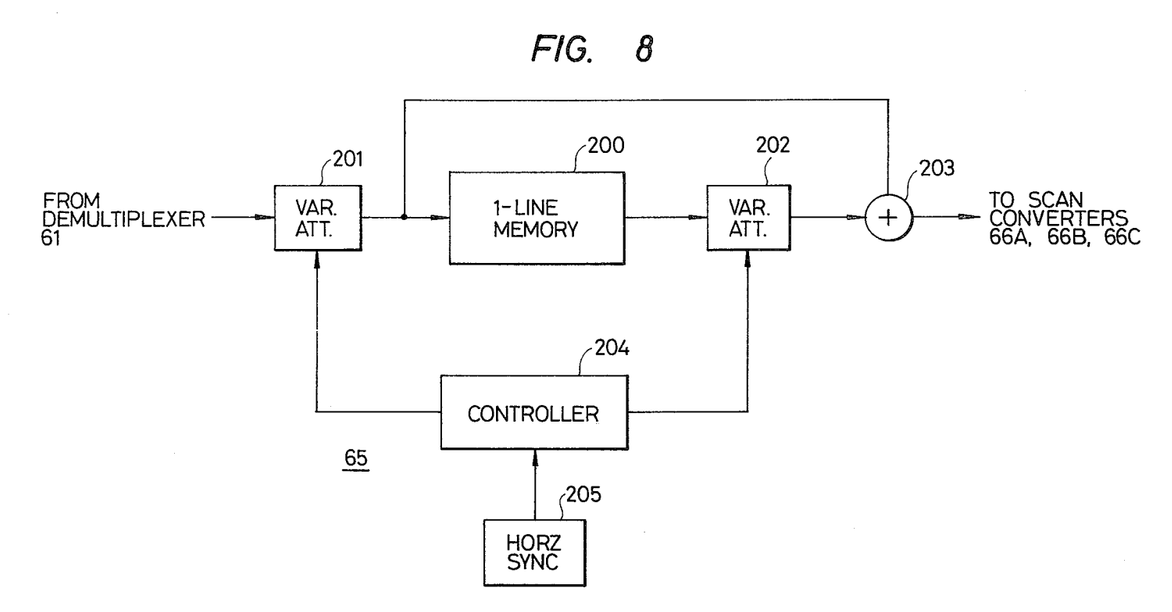
FIG. 8 is a block diagram of the line converter of FIG. 7.

As illustrated in FIG. 8, the line format converter 65 comprises a 1-line memory 200, a first variable loss attenuator 201 by which the input signal is scaled by a weighting factor and fed to the line memory 200, and a second variable loss attenuator 202 coupled to the output of the memory 200 for scaling the output of the memory by a weighting factor. An adder 204 is coupled to the outputs of the attenuators 201 and 202 for generating a 525-line format output. A controller 204, which essentially comprises a read only memory, is coupled to the attenuators 201 and 202. In the read only memory is stored weighting factor data which are successively read in response to a horizontal sync pulse generated by a horizontal sync generator 205 and applied to the attenuators 201 and 202 to vary their weighting factors by predetermined amounts. The weighting factors are controlled so that portions of successive line signals on odd- and even-number fields are equally scaled down and combined in the adder 203 so that the scaled portions of the line signals may correspond to the integral multiple of the (25/21)th scan line. For example, the first line of the 525-line format is derived by scaling the 625-line format signals that occupy about 20% period of the first lines of the odd- and even-number fields in the attenuators 201 and 202 and combining them in the adder 203. The second line of the 525-line format is derived by scaling he signals that occupy about 40% of the second line periods of the odd- and even-number fields and combining them in the adder 203.

The 525-line format digital luminance and color difference signals from the converter 65 are serially written into scan converters 66A, 66B and 66C respectively.

Figure 9:
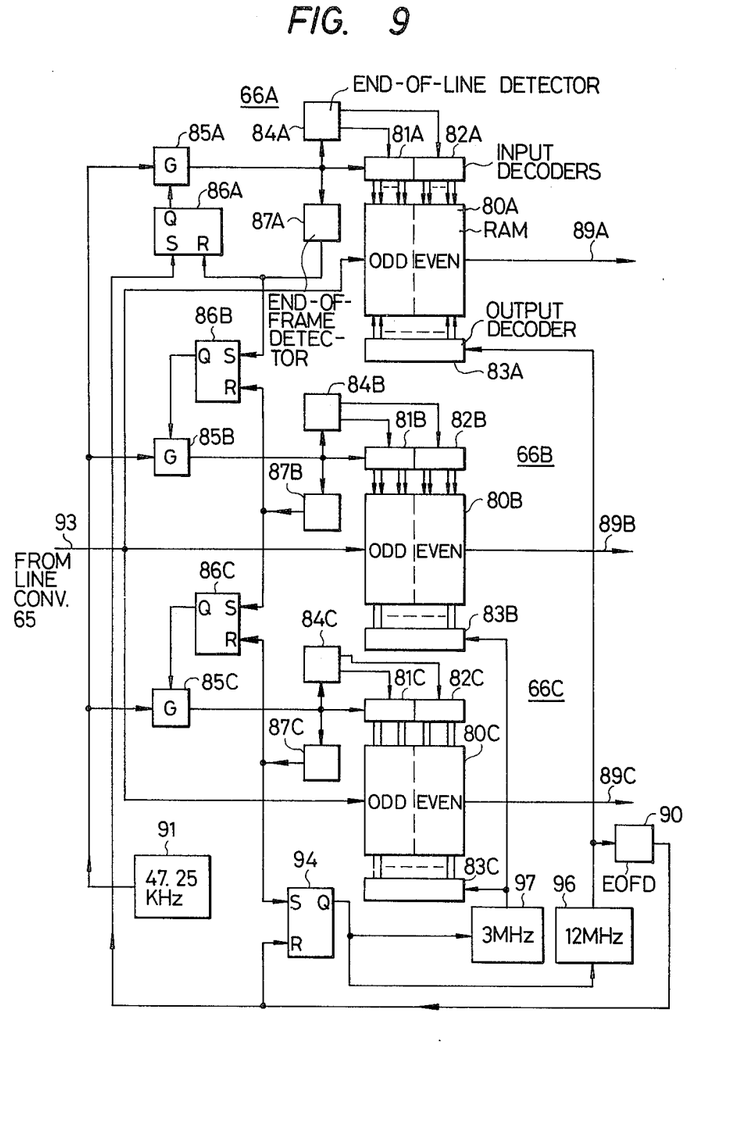
FIG. 9 is a block diagram of the scan converters of FIG. 7.

The signals applied to the scan converters 66A, 66B, 66C are processed in a manner which is the inverse to the scan converters 15A, 15B and 15C to reconvert the signal to the original interlacing format. Details of the scan converters 66 are illustrated in FIG. 9. Each scan converter 66 is of an identical construction. Scan converter 66A comprsies a random access memory 80A, a pair of input decoders 81A, 82A, and an output decoder 83A. The input decoders 81A and 82A are alternately enabled by outputs of an end-of-line detector 84A coupled to the output of a gate 85A. This gate is enabled in response to the output of a flip-flop 86A to apply 47.25 kHz clock pulses from a writing pulse generator 91 when flip-flop 86A is triggered into a set condition by an end-of-frame detector 90 which will be described later. The detector 84A enables the input decoder 81A to permit it to receive pulses from the gate 85A when the luminance line signal of each odd-number field is applied through line 93 to the random access memory 80A and switches to the input decoder 82A to permit it to receive pulses from the gate 85A when the input luminance signal subsequently changes to the even-number field. Thus, the decoder 81A switches the column address of the memory 80A in response to an alternate one of horizontal line scans to store the odd-number field in a first half area of the memory and the decoder 82A switches the column address of a second half area of the memory 80A alternately with the decoder 81A to store the even-number field in that area. An end-of-frame detector 87A is provided to detect when all the frame bits of the luminance signal are written into the memory 80A to reset the flip-flop 86A to cease the application of the writing pulse to the decoders 81A, 82A.

The signal from the end-of-frame detector 87A is also applied to the set input of the flip-flop 86B of the scan converter 66B to start application of writing pulses to the input decoders 81B and 82B. Similar to the scan converter 66A, the odd- and even-number fields of the R-Y signal are stored in separate areas of the memory 80B. The end-of-frame detector 87B detects when all the frame bits of the R-Y signal have been written into the memory 80B to reset the flip-flop 86B and set the flip-flop 86C of the scan converter 66C to initiate the writing of the B-Y signal into the random access memory 80C. At the end of writing operation of the scan converter 66C, the end-of-frame detector 87C resets the flip-flop 86C and sets a flip-flop 94 to simultaneously enable a pair of reading pulse generators 96 and 97 which respectively generates 12 MHz and 3 MHz clock pulses.

The 12 MHz reading pulses are applied to the output decoder 83A to initially read all the odd-number field data and subsequently read all the even-number field data, the read data being a series of 8-bit words which are applied on lead 89A to a digital-analog converter 67 Simultaneously, the 3 MHz reading pulses are applied to the output decoders 83B and 83C of scan converters 66B and 66C to initially read the odd-number fields of the respective color difference signals and subsequently read the even-number fields so that the respective outputs are organized into 8-bit words which are applied respectively on leads 89B and 89C to digital-analog converters 68 and 69. When all frame bits of the luminance signal are read out of the memory 80A, the detector 90 provides an output for resetting the flip-flop 94 to cease the application of reading pulses to the scan converters 66A, 66B, 66C and setting the flip-flop 86A to repeat the above process.

The analog converted luminance and color difference signals are coupled to an encoder 121 where they are interleaved with vertical and horizontal sync pulses supplied from a sync source 123 and color bursts of the NTSC system supplied from a color burst generator 124 to provide a composite NTSC color television signal which appears at output terminal 122. The signal delivered from the output terminal 122 is used to generate a color picture on a conventional display unit, not shown, as a visual aid for the listener hearing the stereophonic sound which is generated by the audio signals on terminals 62, 63 and 64.

When reproducing a 625-line PAL or SECAM signal, the line-format converter 65 is not employed. Instead, the output of the demultiplexer 61 is directly connected to the scan converters 66A, 66B, 66C.

It is seen that the video signal recorded in a manner as described above can be reproduced on any type of television systems without substantially altering the circuitry. It is to be noted that the color difference signals could equally comprise a combination of a (G - Y) component and a (R - Y) or (B - Y) component, or a combination of I and Q signals.

What is claimed is:

1. A digital recording system comprising:
   means for generating still-picture primary color video signals which occur within a frame of interlaced odd-number and even-number fields according to one of the standard line scan-formats;
   a matrix circuit for converting said primary color video signals into a luminance component and color difference components;
   means for converting each of multi-channel analog audio signals into a sequence of digital samples of an audio signal;
   means for converting each of said luminance and color difference components to a sequence of digital samples of a video component;
   storage means having a plurality of storage areas;
   means for writing the digital samples of said video components into respective storage areas of said storage means at a given rate and sequentially reading the digital samples of each video component from the respective storage areas at a rate lower than said given rate so that the digital video components are arranged in a time sequence;
   means for time-division multiplexing said audio digital samples with the digital samples of said video components; and
   means for recording said multiplexed digital samples on a recording disc medium.

2. A digital recording system as claimed in claim 1, wherein said scan format is of a 625-line scan format.

3. A digital recording system as claimed in claim 1 or 2, wherein said writing and reading means is arranged to write the digital samples of each video component into first and second sections of the respective storage area so that the odd-number and even-number fields of each video component are stored in said first and second sections respectively and is further arranged to read the digital samples of each video component alternately out of said first and second sections in response to each line scan of said format.

4. A digital recording system as claimed in claim 1, wherein said storage means comprises:
   first, second and third memories each having a plurality of memory cells; and
   wherein said writing and reading means is arranged for writing said digital samples of said luminance and color difference components respectively into said first, second and third memories so that the odd-number and even-number fields of each video component is stored in separate areas of each of said memories and reading each of the stored digital samples alternately out of said separate areas in response to each line scan of said format so that all the digital samples read out of each of said memories are arranged in sequence, said writing and reading means including means for repeating the writing operation when all the digital samples of said video components are read out of said memories.

5. A digital playback system adapted for reproducing a sequence of time-division multiplexed digital samples of multi-channel audio signals and digital samples of video components of luminance and color difference of a still-picture signal recorded in a disc record, said digital samples of the video components being organized according to one of standardized line scan formats, comprising:
   means for detecting said digital samples from said disc record;
   means for demultiplexing said digital samples of each multi-channel audio signal and said digital samples of each video component;
   storage means having a plurality of storage areas;
   means for sequentially writing the demultiplexed digital samples of each video component into a corresponding storage area of said storage means and sequentially reading the digital samples of each video component out of said storage area simultaneously with the reading of the other video components at a rate higher than the rate at which said digital samples are written into said storage means so that said video components are arranged in respective sequences of digital samples; and
   means for converting the digital samples of each multi-channel audio signal to an analog multi-channel audio signal and converting the digital samples of each video component to an analog video component.

6. A digital playback system as claimed in claim 5, wherein said writing and reading means is arranged for writing the digital samples of each video component alternately into first and second sections of the corresponding storage area in response to the line scan of said format and is further arranged for sequentially reading one-half of the digital samples of each video component from said first section of the corresponding storage area and subsequently reading the remainder of the digital samples from the second section of the corresponding storage area.

7. A digital playback system as claimed in claim 5 or 6, wherein said one of standardized line scan format is of a 625-line scan format.

8. A digital playback system as claimed in claim 7, further comprising means coupled to said demultiplexing means for converting the scan format of the demultiplexed digital samples of each video component to a 525-line scan format.

9. A digital playback system as claimed in claim 8, wherein said converting means comprises:
   a first digital variable attenuator for scaling the digital value of the demultiplexed digital samples of each video component by a variable weighting factor;
   a line memory connected to the output of said first attenuator for storing the scaled digital samples of a scan line from said first attenuator;
   a second digital variable attenuator connected to the output of said line memory for scaling the digital value of the samples applied thereto by a variable weighting factor;

means for combining the digital samples scaled by said first and second attenuators to provide combined digital samples to said storage means; and means for controlling the weighting factors of said attenuators in response to the scan line of the 525-line format.

10. A digital recording system comprising:

means for generating still-picture primary color video signals which occur within a frame of interlaced odd-number and even-number fields according to one of the standard line scan formats;

a matrix circuit for converting said primary color video signals into a luminance component and color difference components;

first converting means for converting each of multi-channel analog audio signals into a sequence of digital samples of an audio signal;

second converting means for converting each of said luminance and color difference components to a sequence of digital samples of a video component;

first, second and third scan converters for converting the digital samples of said luminance and color difference components respectively from the interlaced scan format to digital samples of a non-interlaced scan format;

means coupled to said first, second and third scan converters and to said first converting means for time-division multiplexing said audio digital samples with the digital samples of said video components; and means for recording said multiplexed digital samples on a recording disc medium.

11. A digital recording system as claimed in claim 10, wherein said scan format is of a 625-line scan format.

12. A digital recording system as claimed in claim 10 or 11, wherein each of said scan converters comprises:

a memory having first and second storage sections; and writing and reading means for writing the digital samples of a video component of said interlaced scan format into said first and second storage sections so that the odd-number and even-number fields of said video component are stored in said first and second storage sections respectively and reading the digital samples of each video component alternately out of said first and second sections in response to each line scan of said format.

13. A digital playback system adapted for reproducing a sequence of time-division multiplexed digital samples of multi-channel audio signals and digital samples of video components of luminance and color difference of a still-picture signal recorded in a disc record, said digital samples of the video components being organized in a non-interlaced format according to one of standardized line scan formats, comprising:

means for detecting said digital samples from said disc record;

means for demultiplexing said digital samples of each multi-channel audio signal and said digital samples of each video component;

first, second and third scan converters for converting the digital samples of said luminance and color difference components of the non-interlaced scan format to digital samples of an interlaced scan format; and means for converting the digital samples of each multi-channel audio signal to an analog multi-channel audio signal and converting the digital samples of each video component to an analog video component.

14. A digital playback system as claimed in claim 13, wherein each of said first, second and third scan converters comprises:

a memory having first and second storage sections; and writing and reading means for writing the digital samples of a video component alternately into said first and second storage sections in response to the line scan of said format and sequentially reading one-half of the digital samples of the video component from said first storage section and subsequently reading the remainder of the digital samples from the second storage section.

* * * * *